United States Patent [19]

Pease

[11] 4,105,555

[45] Aug. 8, 1978

[54] MULTI-PORT VALVE

[75] Inventor: Leroy I. Pease, Diamond Bar, Calif.

[73] Assignee: Tolo, Incorporated, Santa Ana, Calif.

[21] Appl. No.: 747,596

[22] Filed: Dec. 6, 1976

[51] Int. Cl.² .............................................. B01D 23/24
[52] U.S. Cl. ............................... 210/136; 137/625.29; 137/599.1; 210/169; 210/278; 210/426; 210/432; 251/283
[58] Field of Search ................... 210/278, 92, 424–426, 210/172, 169, 117, 118, 136, 313, 429–432; 137/625.29, 625.47, 599.1; 251/283

[56] References Cited

U.S. PATENT DOCUMENTS

| | | | |
|---|---|---|---|
| 1,937,324 | 11/1933 | Pick | 137/625.29 |
| 2,182,459 | 12/1939 | Vickers | 251/283 |
| 2,907,349 | 10/1959 | White | 251/283 |
| 2,946,348 | 7/1960 | North | 251/283 |
| 3,316,937 | 5/1967 | Friedman | 137/625.29 |
| 3,451,554 | 6/1969 | Wade | 210/278 |
| 3,536,295 | 10/1970 | Sinkler | 251/283 |
| 3,640,310 | 2/1972 | Erlich | 137/625.46 |
| 3,707,233 | 12/1972 | Lerner | 210/278 |
| 3,809,247 | 5/1974 | Brett | 210/278 |
| 3,907,688 | 9/1975 | Close | 210/424 |

*Primary Examiner*—Frank Sever
*Attorney, Agent, or Firm*—Louis J. Bachand

[57] ABSTRACT

A valve is provided adapted to multiple modes of use including filter, backwash, rinse, recirculate, and direct to waste, on a swimming pool filter of the type normally filtering water under pressure through a backwash-regenerable filtering medium disposed in a filter tank. The valve comprises closely interfitting, relatively rotatable inner and outer sections having coaxially tapered annular walls defining interiorly open spaces respectively within the sections; the outer section wall has formed therein circularly spaced outer ports including an inlet port, a first outlet port, and a second outlet port. The inner section is normally seated against the outer section wall, its interior space being adapted to define a continuation of the filter tank in continuously hydraulically filled relation against unseating pressure imbalances across the inner section. The inner section wall has formed therein a circular series of inner ports selectively pair-registrable with different pairings of the outer ports to define one or another of the several use modes mentioned above.

33 Claims, 12 Drawing Figures

Fig. 7. FILTER

→ RETURN TO POOL

WATER PUMPED FROM POOL

Fig. 8. WASTE

Fig. 9. BACKWASH

MULTI-PORT VALVE

BACKGROUND OF THE INVENTION

This invention has to do with swimming pool filters, and more particularly with a valve structure useful in controlling modes of use of a swimming pool filter.

Swimming pools contain tens of thousands of gallons of water which must be chemically treated and repeatedly filtered to maintain a healthful, attractive condition. For this purpose, variations of swimming pool filters have been devised, including most popularly tank-type filters which contain a regenerable filtering medium either of the fixed or removable bed type. In each type of filter, swimming pool water is passed, under pressure, through the filtering medium, the contaminants are separated therefrom, and the water, now filtered, is returned to the swimming pool. The accumulation of contaminants, typically particulate and oily matter, progressively blocks water passages through the filtering medium and ultimately requires replacement of the filtering medium or renewal thereof. For economy's sake, regenerable filters which may be repetitively renewed are preferred. In such filters, the filtering medium may typically be a bed of sand or a layer of diatomacious earth or the like which is interposed between the inlet and the outlet of the filter for the purpose of trapping particulate or oily contaminants from the swimming pool water being passed therethrough. Upon a sufficient accumulation of such contaminants, the filtering medium "channels" giving non-filtering passage to swimming pool water and/or the pressure within the tank increases to the limit of the pump being used to force water through the filter, as it becomes progressively more difficult for water to find its way through the gelatinous mass of accumulated contamination. The extent of contaminant accumulation may be readily measured by gauging the pressure drop across the filter, which at a given point is a signal that the filter is no longer functioning effectively or that the pump being used to move the pool water is insufficient to effect further movement against the pressure drop experienced across the filtering medium in the filter tank.

At this point, the pool owner needs to regenerate his filtering medium. For this purpose, it is conventional to reverse the flow of water through the filtering medium, whereby the pool water is directed in such a manner that the accumulated contaminants are flushed free of the filtering medium, and, hopefully with as little loss as possible of filtering medium, the contaminants are flushed from the filter tank. Generally, the flushed contaminants are directed to a "waste" line for disposal beyond the pool. After thus "backwashing" the filtering medium, the filter is again connected in the conventional mode and filtration of pool water resumed.

Increasing sophistication of pool owners and rising expectations of equipment performance have dictated refinements in the basic swimming pool filter just described. For example, it has been observed that the reconnection of a swimming pool filter in the filtration mode following a backwash operation results in a discharge of residual contaminant-containing water back into the pool, to the owner's dismay. There has been suggested the use of a "rinse" mode to obviate the problem. In a rinse mode, the swimming pool is connected as for filtration; that is, the pump inlet passes the water through the filtering medium as during filtration, but the outlet from the filter tank is not to the pool, but is again to the waste line until the residual contamination has been completely flushed from the filtering system. It is further sometimes desired by pool owners to have a highly forceful, if unfiltered, flow of water for therapy pools, or spas, as they are called. In such operation modes, swimming pool water is passed through the filter tank but not through the filtering medium, and thus is discharged from the filter tank with virtually full pump force. This mode of operation of the filter is often termed a "recirculation" mode.

Naturally, in each of these modes it is necessary to close off alternate tank connections. In order to provide multi-modal use of the swimming pool filters there have been devised a number of multi-port valves which have settings appropriate to several or all of the foregoing modes of operation of a filter tank.

PRIOR ART

In each of the attempts made to provide the consumer with the most desirable swimming pool filter tank valve, there is provided a valve body and a relatively rotatable valve rotor, the body and rotor being provided with selectively registerable ports which are arranged in a manner to provide the desired interconnection of inlet and outlet lines to accomplish the several functions desired. See, for example, U.S. Pat. No. 3,809,247 issued May 7, 1974 to James E. Brett and references cited therein. In general, these valves, as disclosed, incorporate the conventional valve body and valve rotor assembly with provision of a multiplicity of ports which are alternately registerable to define differing modes of operation. Generally, too, the valves disclosed provide inadequately for the development of continually higher pressures in the filter tank resulting from the continuing accumulation of flow restricting contaminants in the filtering medium. The disclosed valves either tend to lift from the valve seat in response to water pressure, destroying the integrity of the valving system, or in those instances where an effort is made to work with the water pressure to effect improved sealing, the valve design is such that water pressure is not uniformly sensed on the valve and pressure imbalances result which partially lift the seal and again destroy or at least lessen the integrity of the valving system.

SUMMARY OF THE INVENTION

It is accordingly an object of the present invention to provide a multi-port valve improved over multi-port valves heretofore known for swimming pool use. It is another object to provide such a valve which enables filtering, backwash, recirculating, rinsing and direct-to-waste modes of operation conveniently and effectively. It is a further object of the invention to provide such a valve having few moving parts, which is easily made of readily available materials, which is low in cost, and easy to maintain. It is another object of the invention to provide a multi-port valve which is sealing responsive to tank water pressure and in a balanced manner so as to avoid cocking of the valve rotor within the valve body and resultant leakage. It is a further object of the invention to provide a multi-port valve in which wedge side seals are employed to lengthen seal life and to avoid leakage problems. It is a still further object of the invention to provide a valve in which the valving movement is hand or automatically operable. It is yet another object of the invention to provide a valve which may be top-mounted on a swimming pool filter tank or side mounted thereon, in either instance forming a continuation of the tank whereby tank water pressure is uniformly circumferentially exerted in a manner precluding pressure imbalances across the valve rotor and reducing the opportunity for cocking and leakage past the valve components.

These and other objects of the invention are realized in a multiple use mode valve for swimming pool filter of the type passing water under pressure through a backwash regenerable filtering medium disposed in a filter tank, where the valve comprises interfitting and relatively rotatable inner and outer circular sections having nested and coaxially tapered annular respective wall members, the outer section wall member defining plural outer ports in circular series, including an inlet port for water pumped from the pool to be filtered; a first outlet port for filtered water returned to the pool; and a second outlet port for waste water; the inner section wall member normally seating within the outer section and defining inwardly thereof an interior space in open communication with the tank in annularly pressurized relation against unseating pressure imbalances across the inner section; the inner section wall member having a plurality of vertically disposed inner ports coplanar with the circular series of outer ports and circularly spaced to alternately communicate in water passing relation two of the outer ports in registering response to relative rotation of the wall members while blocking water passage through the other outer port. There may further be provided tank external means axially urging the inner and outer sections into seating relation, the inner and outer sections typically being axially separable for unseated rotation between alternate positions. There is further provided seal structure between the inner and outer sections surrounding registered inner and outer ports to block water leakage between the registered ports responsive to tank water pressure biasing of the inner section to seat against the outer section. The filter tank may include a riser assembly defining a filtering medium free passage through the tank, the inner section then including a body passage closed to the inner section interior and adapted to communicate a restricted inner port exclusively with the riser assembly. Typically, the present valve inner section ports include a pair of ports relatively circularly spaced and opening onto the inner section interior to respectively register with the inlet port and the first outlet port, the ports in registry recirculating pool water to and from the pool without pressure drop resulting from passage through the filtering medium. The valve further includes means of simultaneously blocking other inner ports in registry with the other outer port against water flow therethrough.

The valve further embodies inner ports including a pair of ports relatively circularly spaced and in open communication with the inner section interior to respectively register with the inlet port and the second outlet port, the ports in registry then passing water from the pool directly to waste without passage through the filtering medium.

The valve inner section further may include a first inner port, an inner section body passage restricting the first inner port from communication with the inner section interior, a second inner port in open communication with the inner section interior, and a third inner port selectively in open or closed communcation with the inner section interior; the inner section ports being progressively circularly spaced to register (in a filtration mode) the first inner port with the first outlet port and the third inner port with the inlet port, passing pool water forward through the filtering medium and returning the same to the pool, the second inner port being blocked; and (in a backwash mode) to register the first inner port with the inlet port and the second inner port with the second outlet port, passing pool water backward through the filtering medium to waste, the third inner port being blocked; and to register (in a rinse mode) the first inner port with the second outlet port and the third inner port with the inlet port, passing water forward through the filtering medium to waste, the second inner port being blocked.

The invention further contemplates provision of support means resiliently biasing the inner section to seat against the outer section in axially rotatable relation.

In a preferred embodiment of the invention, there is provided a valve adapted to multiple modes of use, including filter, backwash, rinse, recirculate, and direct-to-waste, on a swimming pool filter of the type normally filtering water under pressure through a backwash regenerable filtering medium disposed in a filter tank, the valve comprising closely interfitting relatively rotatable inner and outer sections having coaxially tapered annular walls defining interiorly open spaces respectively within the sections, the outer section wall having formed therein circularly spaced outer ports including an inlet port, a first outlet port and a second outlet port; the inner section being normally seated against the outer section wall, the inner space thereof being adapted to define a continuation of the filter tank in continuously hydraulically filled relation against unseating pressure imbalances across the inner section, the inner section wall further having formed therein a circular series of inner ports selectively pair-registerable with different pairings of the outer ports to define correspondingly different use modes of the valve. The preferred embodiment of the valve further may include an axial stem supporting the inner section within the outer section in rotatable relation, the stem being axially movable and the inner section movable therewith to effect axial unseating of the sections in rotation facilitating relation. Handle means may be formed on the stem and compression spring means provided centered on the stem between the outer section and the stem handle means resiliently axially biasing the inner section towards seating against the outer section.

With reference to the configuration of the outer section, the inlet port thereof may be adapted to pass pool water from a pump outlet into the filter tank, the first outlet port thereof being adapted to pass tank water to a pool return line and the second outlet port thereof adapted to pass tank water to a waste water line.

The valve may further include seal structure between the inner and outer sections having sealing response to the axial biasing of the inner section toward the outer section by the mentioned compression spring. The seal structure typically comprises an annular recess in the inner section wall circumscribing each inner port, and a resilient seal ring inserted therein in spring urged sealing engagement with the outer section wall thereopposite, the seals being out of such engagement upon axial separation of the inner and outer sections.

With further reference to the configuration of the inner section of the valve, such section further defines a body passage restricting an inner section wall port from communication with the inner section interior space. The restricted inner section wall port is registerable alternately with the inlet port, the first outlet port, and the second outlet port of the outer section wall to respectively direct pool water into the tank, from the tank back to the pool, and from the tank to waste. The inner section configuration further may define additional ports in circularly spaced relation with the restricted port, the additional ports including a second inner port registerable with the inlet port when the restricted inner port is in registration with the first outlet port to define the filtration mode of the valve operation. Further, the valve inner section additional ports may include a third inner port registerable with the second outlet port when the restricted inner port is in registration with the inlet port, to define the backwash mode of the valve operation. Still further, the valve inner section additional ports may include a fourth inner port registerable with the inlet port when the restricted inner port is in registration with the second outlet port to define the rinse mode of the valve operation.

Valve means further are provided blocking outward flow of water through the fourth inner port and permitting inward flow therethrough, the valve means comprising a hinged check valve normally blocking the fourth inner port and responsive to inlet port water pressure to open the fourth inner port when the restricted inner port is in registration with the second outlet port. Further, the valve inner section additional ports may include a fifth inner port, the fifth inner port being registerable with the inlet port when the second inner port is in registration with the first outlet port, to define the recirculation mode of the valve. Valve means may be provided to block outward flow of water through both the fourth and the fifth inner ports and to permit inward flow through said fifth port in registration with said inlet port. Thus, when the fifth inner port is registered with the first outlet port and the restricted inner port is registered with the inlet port as in the backwash mode of the valve and filter tank, there may be provided fifth inner port valve means comprising a hinged check valve acting to block backwash water returned to the pool through the fifth inner port.

In still another mode of operation of the valve, the second inner port is registerable with the second outlet port when the third inner port is in registration with the inlet port, to define the direct-to-waste mode of valve operation, the fourth inner port then being in registration with the first outlet port and blocked by its check valve as described to block waste water return to the pool.

The described valve is intended to be combined with a filter tank of conventional construction, e.g. a filter tank containing a regenerable filtering medium and including a riser assembly comprising a riser tube conveying water within the tank in filtering medium by-passing relation, the valve inner section body passage being open to the riser tube in water-conveying relation to or from the restricted inner port and out of contact with surrounding water. The riser assembly may comprise means-diffusing inlet received water in advance of the filtering medium in the filtration mode of the valve.

BRIEF DESCRIPTION OF THE DRAWINGS

The invention will be further described as to illustrative embodiment in conjunction with the attached drawings in which.

DESCRIPTION OF THE PREFERRED EMBODIMENTS

As the description of the drawings proceeds, the operating advantages resulting from the present valve design will become apparent, especially in respect of the balanced pressurization of the valve rotor, relative to the stator or valve body at all levels of pressure, and in all operating modes. This feature derives from the circular nesting of the valve rotor in the valve body, hydraulically full and urged into simultaneous circumferential engagement with the valve body all about its pheriphery, whereby portions of the valve rotor are similarly pressurized, against unseating from unequal, unbalancing hydraulic forces.

Figures 1, 5, 6:
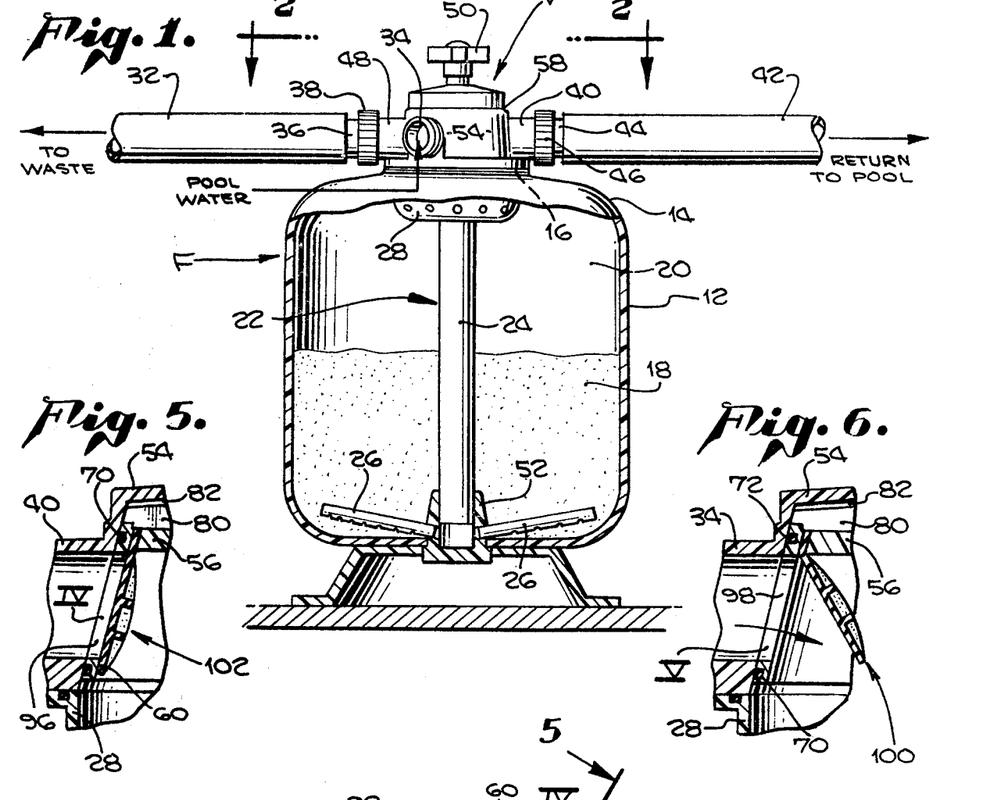
FIG. 1 is a view in side elevation, partly broken away, of the valve according to the invention mounted on a swimming pool filter.
FIG. 5 is a view taken on line 5—5 in FIG. 4 showing the hinged check valve across an inner section port in closed position.
FIG. 6 is a view like FIG. 5 showing the check valve open.
Figure 3:
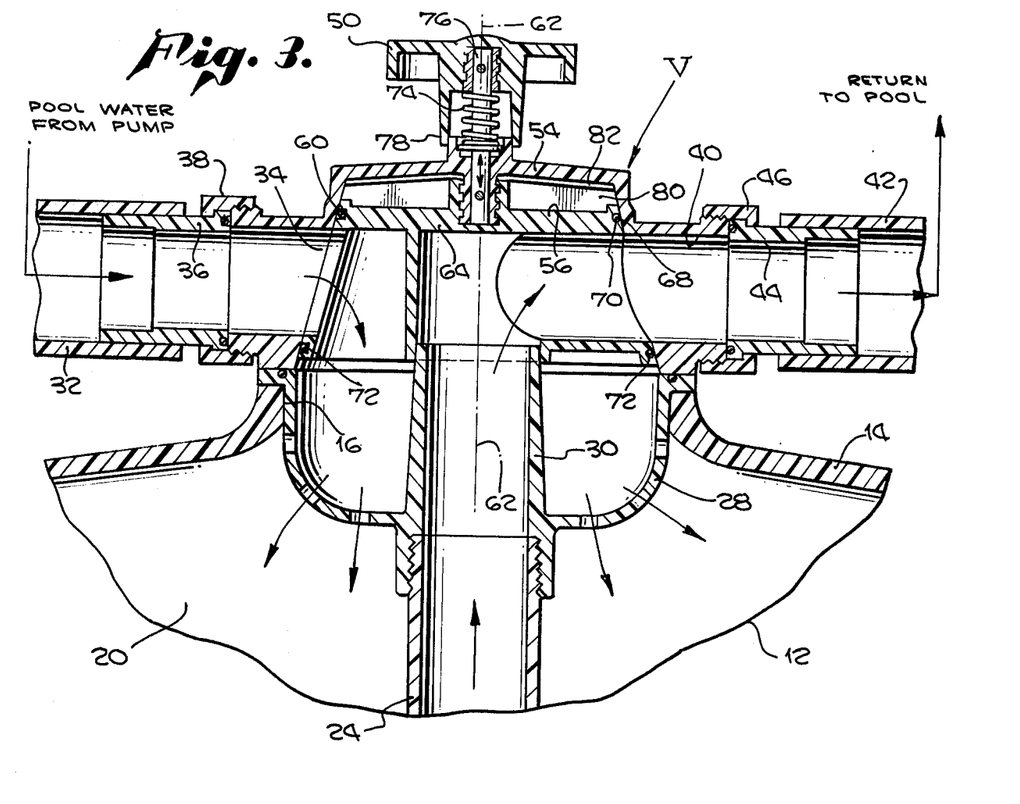
FIG. 3 is a view in vertical section through the valve taken on line 3—3 in FIG. 2.

With reference now to the drawings in detail, and in FIGS. 1 and 3 particularly, a filter F is depicted comprising a tank 12 suitably formed of sheet metal or fiberglass reinforced polyester or like resin into a generally cylindrical shape with sloping upper shoulders 14 terminating in an axial upper opening 16 to which the valve V according to the invention is mounted and secured by conventional means (not shown). Within the tank 12 a loosely disposed mass 18 of filtering medium e.g. sand occupies somewhat more than one-half of the tank interior 20. An axially disposed riser assembly 22 is provided comprising a riser tube 24 having a plurality of collectors 26 at the base and surmounted by a diffuser bowl 28. Riser tube 24 communicates openly with valve V through tubular boss 30 in diffuser bowl 28 into which the riser tube is partially threaded.

The valve V externally is connected to a pumped water supply source e.g. a pool (not shown) through supply conduit (not shown) coupled with inlet port 34. The valve V is further connected through first outlet 40 to return conduit 42 coupled by flanged adapter 44 and nut 46 to the valve for return of water to supply, e.g. to the pool (not shown). A second outlet 48 is provided on the valve V for purposes to be described. Like port 40, second outlet port 48 is coupled to a conduit 32, by a flanged adaptor sleeve 36 and a nut 38. Atop the valve V is a rotatable and axially depressible mode selector handle 50 for purposes to be described.

The operation of the filter F is conventional in its filtering aspects. Water from the pool or other supply, is pumped into the filter tank 12 by a pump (not shown) and diffused downward through diffuser bowl 28 onto the filtering medium mass 18. Filtered water passing downward through the mass is collected by collectors 26, passed into the manifold 52 and thence upward through riser tube 24, by-passing the filtering medium and incoming water for exit through first outlet 40. In use, as noted, contaminant accumulation needs to be removed. Accordingly, the flow of water through the filter tank 12 may be reversed by operation of the valve V so that incoming water from conduit into inlet port 34 is directed down through the riser tube 24, out through the manifold 52, the collectors 26 and thence through the filtering medium 18, usually disrupting the bed upward for cleaning purposes, whereupon the purged contaminants and flushing water enter the valve V and by appropriate orientation of the valve, to be described, are directed out the second outlet port 48 to sewer, on to the ground or otherwise to "waste."

Other operations of the filter F will be described in conjunction with specific modes of valve port positioning.

Figure 2:
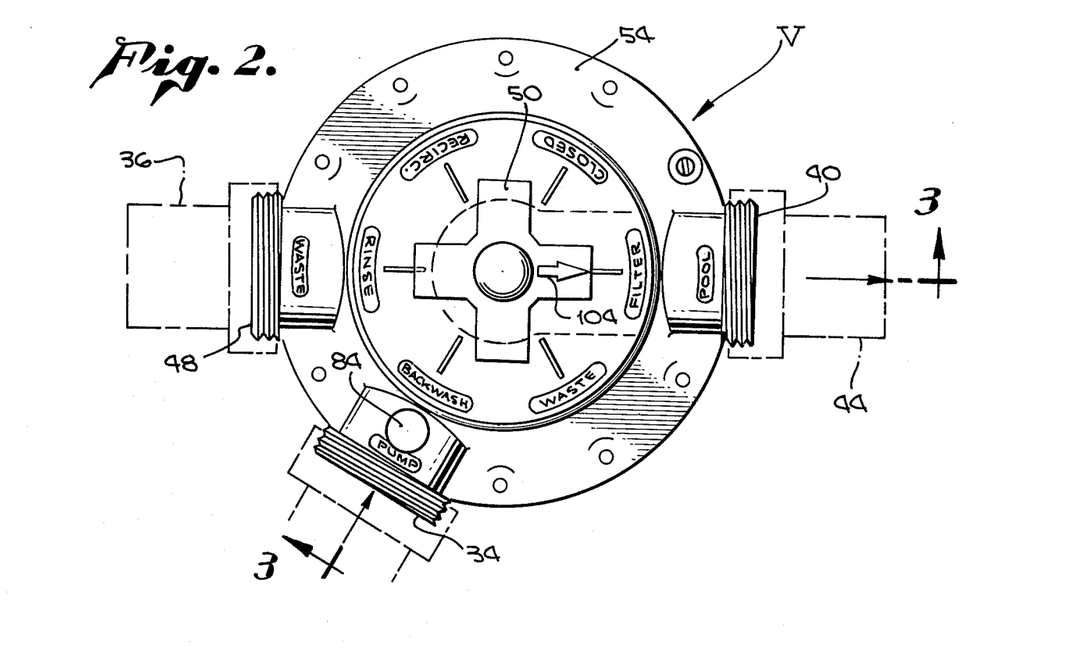
FIG. 2 is a top plan view of the valve according to the invention taken on line 2—2 in FIG. 1.
Figure 4:
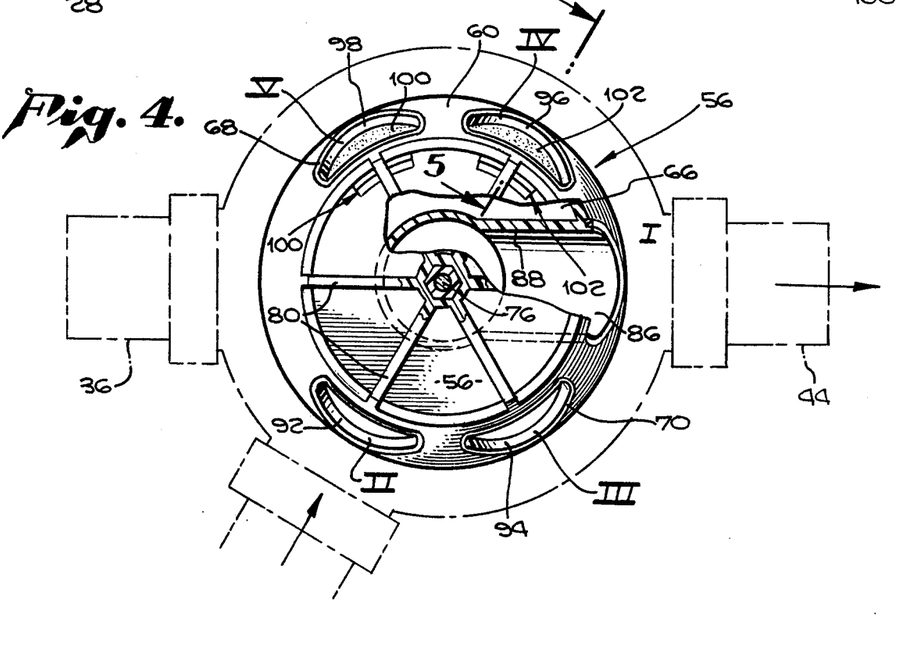
FIG. 4 is a top plan view of the valve rotor or inner section.

With reference now particularly to FIGS. 2, 3 and 4, the valve V comprises: an outer section 54 defining the stator or valve body and provided with an inlet port 34, a circularly spaced first outlet port 40, and a second outlet port 48 diametrically opposite port 40; and an inner section 56, defining the valve rotor and provided with a circularly distributed series of five ports 90, 92, 94, 96, and 98 selectively registerable with alternate pairings of the outer section ports. Both inner and outer valve sections 54 and 56 are partially conical sections, having respective coaxially tapered walls 58, 60 relative to the valve center axis 62 so that the respective wall members interfit in sliding relation for rotation, and axially as well, as will be decribed. The inner section 56 has a top wall 64 forming a domed interior space 66 in the inner section circumscribed by the tapered side wall 60 and covered by the top wall 64. In filter use, the interior space 66 is hydraulically full, i.e. is water filled with pressurized water being passed through the tank, water pressure thus is exerted about the inner periphery of the valve inner section 56, stabilizing the section against cocking in the interfittment of its wall 60 with the outer section wall 58.

The inner section 56 is provided with five circularly spaced ports which for convenience in reference will be given roman numerals I-V. It will be noted of all the inner section ports that each is exteriorly circumscribed by an annular seal 68 comprising a seal ring 70 disposed in an annular recess 72 in projecting relation to bear against the outer section wall 58 for locally sealing the respective ports relative to the outer section. The seal thus effected, responsive to hydraulic pressure within the interior 66 of the inner section, is a wedge side seal which is long-lasting and not adversely affected by normal or overpressures within the filter tank 12 or valve V during filter F operation in its sealing performance.

Additional seating force on the seal ring 70 is realized by provision of a compression spring 74 atop the valve outer section 54. As will be evident from a consideration of FIG. 3, the spring 74 acting between the handle 50 and the valve outer section 54 urges the inner section 56 upward and seatingly against the outer section in resilient relation; the spring force being taken on the several seal rings 70 improving their sealing effectiveness thereby.

It will further be noted from FIG. 3 that the stem 76 is so proportioned relative to skirt 78 of handle 50 that the handle and stem may be moved downward toward the outer section 54. This movement, because the stem 76 is connected to the valve inner section 56, causes the inner section to descend, separating axially from the outer section, breaking the seal at seals 70, and axially misalining ports I-V and the ports 34, 40 and 48 of the outer section 54 from their normally coplanar condition, whereupon the handle 50 may be rotated, rotating in turn the stem 76 and inner section 56, e.g. to a new orientation of the respective inner and outer section ports. Detent ribs 80 on outer section 56 are provided to register with slots 82 in the inner section to ensure full alinement of the sections upon release of the handle 50.

The simple down and twist adjusting movement of stem 76 enables ready adaptation of this valve structure to automated actuators, e.g. those responsive to tank 12 pressure to backwash the filtering medium. A pressure sensor (not shown), may be mounted at 84 (FIG. 2) for this purpose.

The inner section 56 includes a first radially disposed opening 86, designated port I (FIG. 3) which communicates through inner section body passage 88 radially and then axially to the center tubular boss 30 of the diffuser bowl 28. The port I is thus closed from the interior 66 of the inner section 56. All other inner section radial openings 92, 94, 96, and 98 are open to the section interior 66 to define respectively port II (opening 92), port III (opening 94), port IV (opening 96), and port V (opening 98). Ports V and IV are additionally provided with self-hinged one-way "flapper" valves 100, 102; valves 100, 102 being detailed in FIGS. 5 and 6, to limit water passage through these ports to inward only, (see FIGS. 5 and 11), and closing the port when outward flow would be detrimental, e.g. when backwashing the filtering medium (see FIGS. 9 and 6).

OPERATION

Having described the structure of the present valve, we turn now to FIGS. 7–12 to explain the several alternative relative orientations of the inner and outer sections 54, 56 and the water flow paths and thus the filter operation modes, resultant therefrom.

Figures 7, 8:
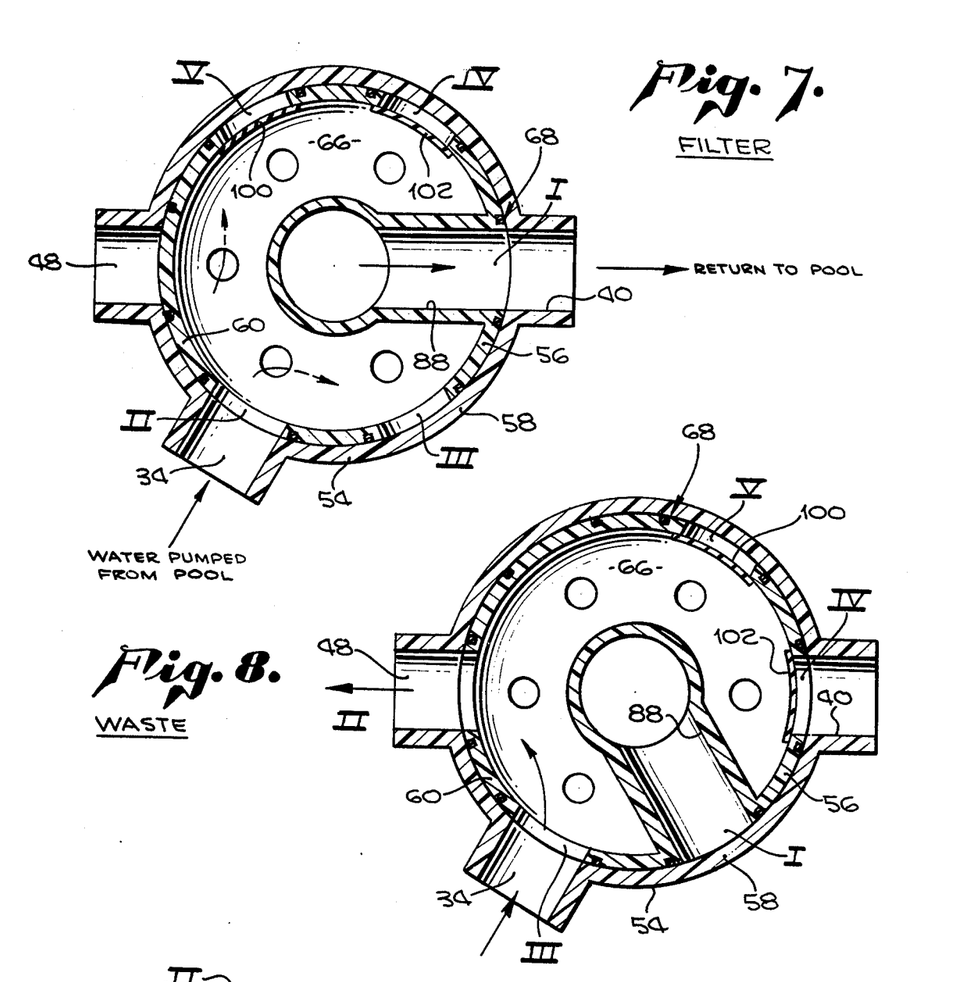
FIGS. 7, 8, 9, 10, 11, and 12 are like figures depicting specifically different relative orientations of the valve rotor or inner section relative to the valve body or outer section for purposes of filtering, water to waste, backwash, rinsing, recirculating, and closed condition, respectively.

The initial position is filtration (cf. arrow 104 in FIG. 2) and with reference to FIG. 7 it will be noted that outer section inlet port 34 is alined with port II. The port II being open to the interior 66 of the inner section 56, water delivered through port II goes directly downward through diffuser bowl 28, filtering medium 18 and thence upward from collectors 26 through the riser 24 which is communicated directly with port I through inner section body passage 88. Port I is correspondingly alined with first outlet port 40 which, as noted above, is connected to the pool return line. Thus filtered water is sent back to the pool.

Figure 9:
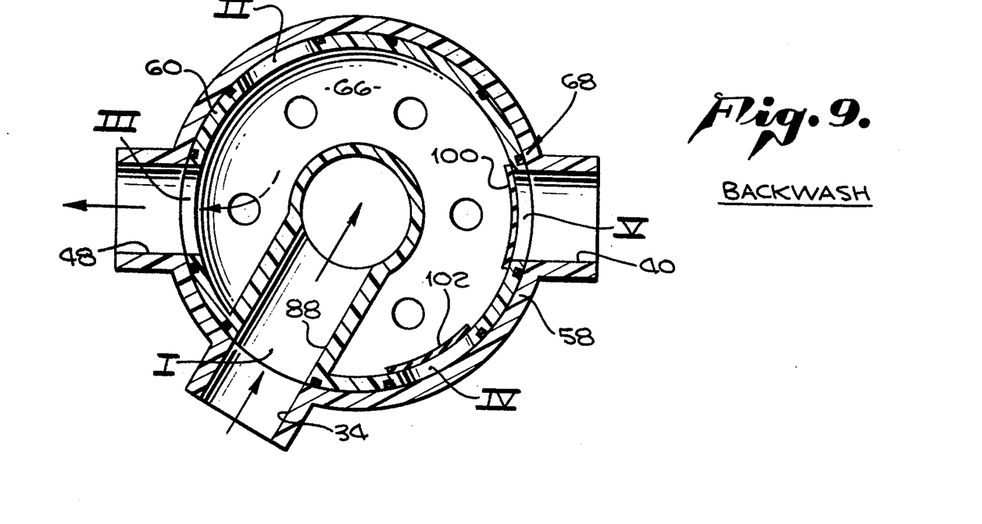

Backwash of the filter F is realized by reorienting the valve ports. Thus depression of handle 50 and rotation of stem 76 and inner section 56 thereby to aline arrow 104 with "backwash" (FIG. 2), as seen in FIG. 9, this movement alines port I with the inlet 34 and the incoming water is directed through body passage 88 to the bottom of tank 12, out through collectors 26 and upward through the filtering medium 18. Port III, alined with second outlet port 48, is open to the inner section interior 66 and receives the flushing water and contaminants lifted from the medium, and passes the same from the valve to waste or sewer. Ports II and IV are blocked by the outer section wall 58 and port V is blocked by flapper valve 100 against passing dirty water back to the pool, although the port V is alined with the pool return or first outlet port 40.

Figures 10, 11:
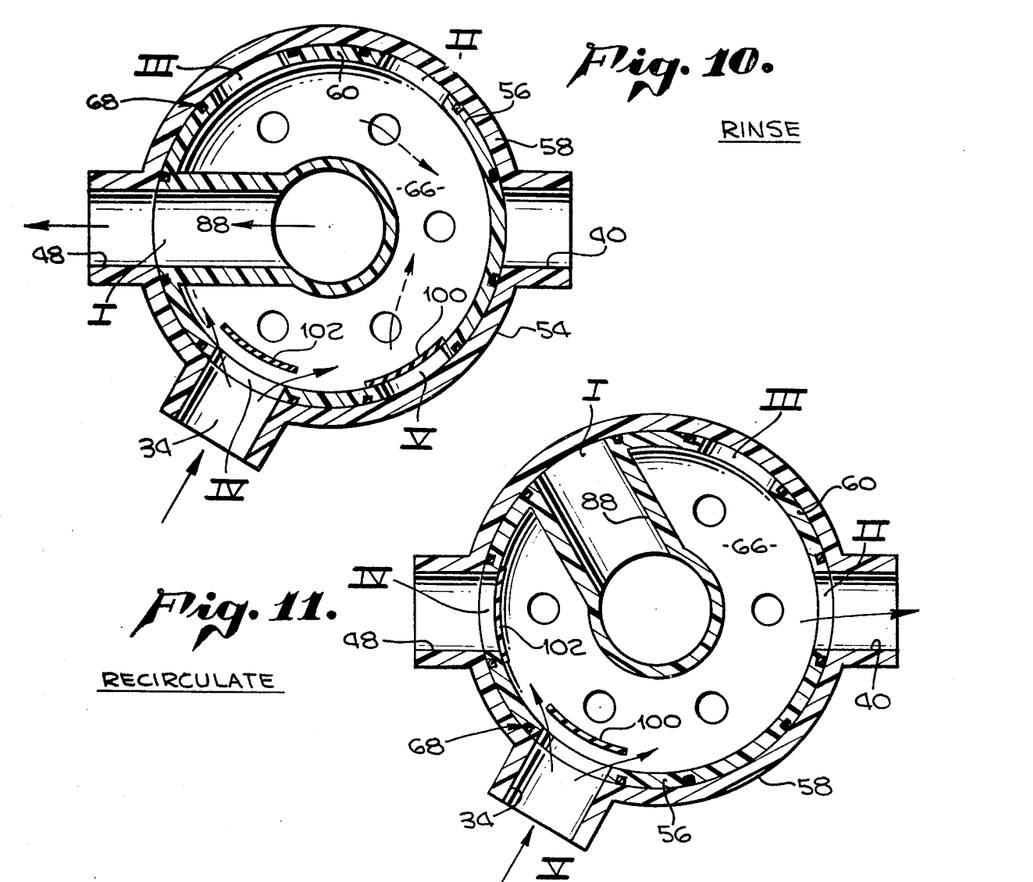

Following backwash it is desirable to rinse the filter F before resuming filtering operations so that residual contaminants are not returned to the pool. With reference to FIG. 10, the rinse orientation of the valve sections is shown. Port I is alined with the second outlet port 48 (arrow 104 FIG. 2 will be alined with the legend "rinse"), thus communicating the body passage 88 and riser tube 24 with the second or waste outlet. Port IV is thus registered with inlet port 34, the inrush of water displacing inward the flapper valve 102 as shown, whereby water passes downward through the filtering medium and upward through the riser tube, cleaning the filtering medium for return to filtration operation. In this alinement, ports II, III and V are blocked by wall 58 of the outer section 54 and the pool return or first outlet is blocked by wall 60 of the inner section 56.

Other special uses of a swimming pool filter are made possible by the valve section alinements shown in FIGS. 8 and 11. Thus in FIG. 8 a direct-to-waste alinement is shown, such as might be useful for pool vacuuming, particularly where leaves and other large debris are vacuumed up that would quickly overload the filter F. In FIG. 8, the inlet port 34 is in registry with port III and second outlet port 48 is in like registry with port II, both ports being open to the inner section interior 66 whereby incoming water passes directly to exit through port II and second outlet 48, to waste. The leaves and other large debris do not penetrate the filter bed since there is no exit in that direction. In the direct-to-waste orientation of FIG. 8, port I and port V are blocked by outer section wall 58, and port IV is blocked against outflow by flapper valve 102.

With reference now to FIG. 11, a recirculate mode is depicted such as is useful when forceful water flow is wanted, e.g. for a therapy pool. In this alinement, port V is registered with inlet port 34 and first outlet, or pool return port 40 is registered with port II. Ports I and III are blocked by outer section wall 58, and port IV although registered with second outlet port 48 is blocked by its flapper valve 102. The result is incoming water is directed immediately to the pool across the top of the filtering medium and within interior 66 of the inner section 56 for high rate, high pressure delivery.

Figure 12:
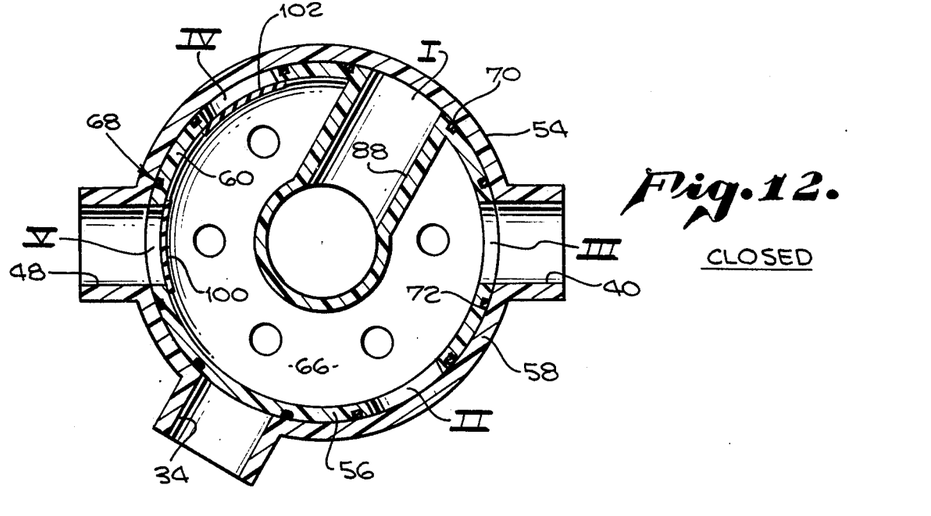

One further "closed" valve section alinement is depicted. In FIG. 12, port III is alined with the pool return or first outlet 40 and port V is alined with the second outlet 48. Other ports are blocked; all flow through the valve is blocked.

It is additionally possible to set the valve at a "winterize" position by deliberately setting detent rib 80 between slots 82, i.e. against the upper portion of the top wall of the inner section 56. The detent ribs 80 thus prevent cooperative sealing engagement of the sections; the valve seal pressure is not realized and the filtration system may drain to prevent water freezing within the system.

Thus, by provision of detenting structure, e.g. ribs and slots 80, 82, there is realized preferentially detenting of the inner and outer sections 56, 54 in alined relation of pairs of the ports 90, 92, 94, 96 and 98 with pairs of ports 34, 40 and 48. Also, the detent structure is responsive to port misalinement to prevent valve sealing.

From the foregoing it will be evident that the present valve provides a pair of nested interfitting valve sections, the inner section of which is hydraulically filled in open, unobstructed communication with tank water in a manner that the water pressure, however great, continuously urges the inner section annularly against the outer section in a balanced manner whereby pressure imbalances across the inner section are avoided or eliminated, and resulting leakages obviated.

I claim:

1. Multiple use mode non-plug valve for a swimming pool filter of the type passing water under pressure through a backwash regenerable filtering medium disposed in a filter tank, said valve comprising interfitting and relatively rotatable inner and outer circular sections having nested and coaxially tapered annular respective wall members, said outer section wall member defining plural outer ports in circular series including an inlet port for water pumped from the pool to be filtered; a first outlet port for filtered water returned to the pool; and a second outlet port for waste water; said inner section wall member normally seating within said outer section in sealing response to filter tank water pressure and defining inwardly thereof an interior space in open unobstructed communication with said tank to eliminate pressure imbalances across said inner section, said inner section wall member having a plurality of vertically disposed inner ports coplanar with said circular series of outer ports and circularly spaced to alternate communicate in water passing relation two of said outer ports in registering response to relative rotation of said wall members while blocking water passage through the other outer port.

2. Valve according to claim 1 including also tank external means axially urging said inner and outer sections into seating relation.

3. Valve according to claim 1 including also seal structure between said sections surrounding registered inner and outer ports to block water leakage between said registered ports responsive to tank water pressure biasing of said inner section to seat against said outer section.

4. Valve according to claim 1 in which said inner and outer sections are axially separable for unseated rotation between alternate positions.

5. Valve according to claim 1 in which said filter tank includes a riser assembly defining a filtering medium-free passage through said tank, and including also an inner section body passage closed to the inner section interior and adapted to communicate a thereby restricted inner port exclusively with said riser assembly.

6. Valve according to claim 1 in which said inner ports include a pair of ports relatively circularly spaced and opening onto the inner section interior to respectively register with said inlet port and said first outlet port, said ports in registry recirculating pool water to and from the pool without pressure drop resulting from passage through the filtering medium.

7. Valve according to claim 6 including also means of simultaneously blocking the other inner ports in registry with outer ports against water flow therethrough.

8. Valve according to claim 1 in which said inner ports include a pair of ports relatively circularly spaced and in open communication with said inner section interior to respectively register with said inlet port and said outlet port, said ports in registry passing water from the pool directly to waste without passage through the filtering medium.

9. Valve according to claim 1, in which said inner section includes a first inner port, an inner section body passage restricting said first inner port from the inner section interior, a second inner port in open communication with the inner section interior, and a third inner port selectively in open or closed communication with the inner section interior; said inner section ports being progressively circularly spaced to register, in a filtration mode, said first inner port with said first outlet port and said third inner port with said third inlet port passing pool water forward through the filtering medium and returning to the pool, said second port being blocked; in a backwash mode, said first inner port with said inlet port and said second inner port with said second outlet port passing pool water backward through the filtering medium to waste, said third inner port being blocked; and in a rinse mode, said first inner port with said second outlet and said third inner port with said inlet port passing water forward through the filtering medium to waste, said second inner port being blocked.

10. Valve according to claim 1 including also support means resiliently biasing said inner section to seat against said outer section in axially rotatable relation.

11. Valve according to claim 1 in combination with a filter tank.

12. A non-plug valve adapted to multiple modes of use including filter, backwash, rinse, recirculate, and direct to waste, for a swimming pool filter of the type normally filtering water under pressure through a backwash regenerable filtering medium disposed in a filter tank, said valve comprising closely interfitting, relatively rotatable inner and outer sections having coaxially tapered annular walls and defining an open interior space within said sections, said outer section wall having formed therein circularly-spaced outer ports including an inlet port, a first outlet port and a second outlet port; said inner section being normally seated against said outer section wall in sealing response to filter tank water pressure, the inner section interior space being in open unobstructed communication with said tank, so as to eliminate pressure imbalances across said inner section; said inner section having formed therein a circular series of inner ports selectively pair-registerable with different pairings of said outer ports to define correspondingly different use modes of the valve.

13. Valve according to claim 12 including also an axial stem supporting said intersection within said outer section in rotatable relation.

14. Valve according to claim 13 in which said stem is axially movable and the inner section therewith to effect axial unseating of said sections in rotation facilitating relation.

15. Valve according to claim 14 including also handle means formed on said stem and compression spring means centered on the stem between said outer section and said stem handle means resiliently axially biasing said inner section toward seating against said outer section.

16. Valve according to claim 15 in which said outer section inlet port is adapted to pass pool water from a pump outlet into said tank, said first outlet port is adapted to pass tank water to a pool return line, and said second outlet port is adapted to pass tank water to a waste water line.

17. Valve according to claim 16 including also seal structure between said inner and outer sections having sealing response to the axial biasing of said inner section towards said outer section by said compression spring.

18. Valve according to claim 17 in which said seal structure includes an annular recess in said inner section wall circumscribing each inner port and a resilient seal ring inserted therein in spring-urged sealing engagement with said outer section wall, said seal rings being out of said engagement upon said axial separation of said inner and outer sections.

19. Valve according to claim 18 in which said inner section further defines a body passage restricting an inner section wall port from communication with said inner section interior space.

20. Valve according to claim 19 in combination with a filter tank adapted to be substantially filled with regenerable filtering medium, said filter tank including a riser assembly comprising a riser tube conveying water within said tank in filtering medium by-passing relation, said valve inner section body passage being open to said riser tube in water-conveying relation to or from said restricted inner port and out of contact with surrounding water.

21. The combination according to claim 20 in which said riser assembly further comprises means of distributively diffusing inlet received water onto said filtering medium in the filtration mode of said valve.

22. The combination according to claim 20 including also structure preferentially detenting said inner and outer sections in port alined relation, said structure being responsive to port misalinement to prevent valve sealing.

23. Valve according to claim 19 in which said restricted inner section wall port is registerable alternately with said inlet port, said first outlet port and said second outlet port of said outer section wall to respectively direct pool water into said tank, from said tank back to the pool, and from said tank to waste.

24. Valve according to claim 23 in which said inner section further defines additional ports in circularly spaced relation with said restricted inner port, said additional ports including a second inner port registerable with said inlet port when said restricted inner port is in registration with said first outlet port to define the filtration mode of the valve operation.

25. Valve according to claim 24 in which said valve inner section additional ports further include a third inner port registerable with said second outlet port when said restricted inner port is in registration with said inlet port to define the backwash mode of the valve operation.

26. Valve according to claim 25 in which said valve inner section additional ports further include a fourth inner port registerable with said inlet port when said restricted inner port is in registration with said second outlet port to define the rinse mode of the valve operation.

27. Valve according to claim 26 including also valve means blocking outward flow of water through said fourth inner port and permitting inward flow therethrough.

28. Valve according to claim 27 in which said valve means comprises a hinged gate normally blocking said fourth inner port and responsive to inlet port water pressure to open said fourth inner port when said restricted inner port is in registration with said second outlet port.

29. Valve according to claim 28 in which said valve inner section additional ports further include a fifth inner port, said fifth inner port being registerable with said inlet port when said second inner port is in registration with said first outlet port to define the recirculation mode of said valve.

30. Valve according to claim 29 including also valve means blocking outward flow of water through said fourth and fifth inner ports and permitting inward flow through said fifth port in registration with said inlet.

31. Valve according to claim 30 in which said fifth inner port is registered with said first outlet when said restricted inner port is registered with said inlet in the backwash mode, and including also fifth inner port valve means comprising a hinged check valve acting to block backwash water returned to the pool through said fifth inner port.

32. Valve according to claim 31 in which said second inner port is registerable with said second outlet port when said third inner port is in registration with said inlet port to define the direct-to-waste mode of the valve operation, said fourth inner port being in registration with said first outlet port and blocked by its said check valve to block waste water return to said pool.

33. Valve according to claim 12 in combination with a filter tank.

* * * * *